United States Patent Office 2,794,512
Patented June 4, 1957

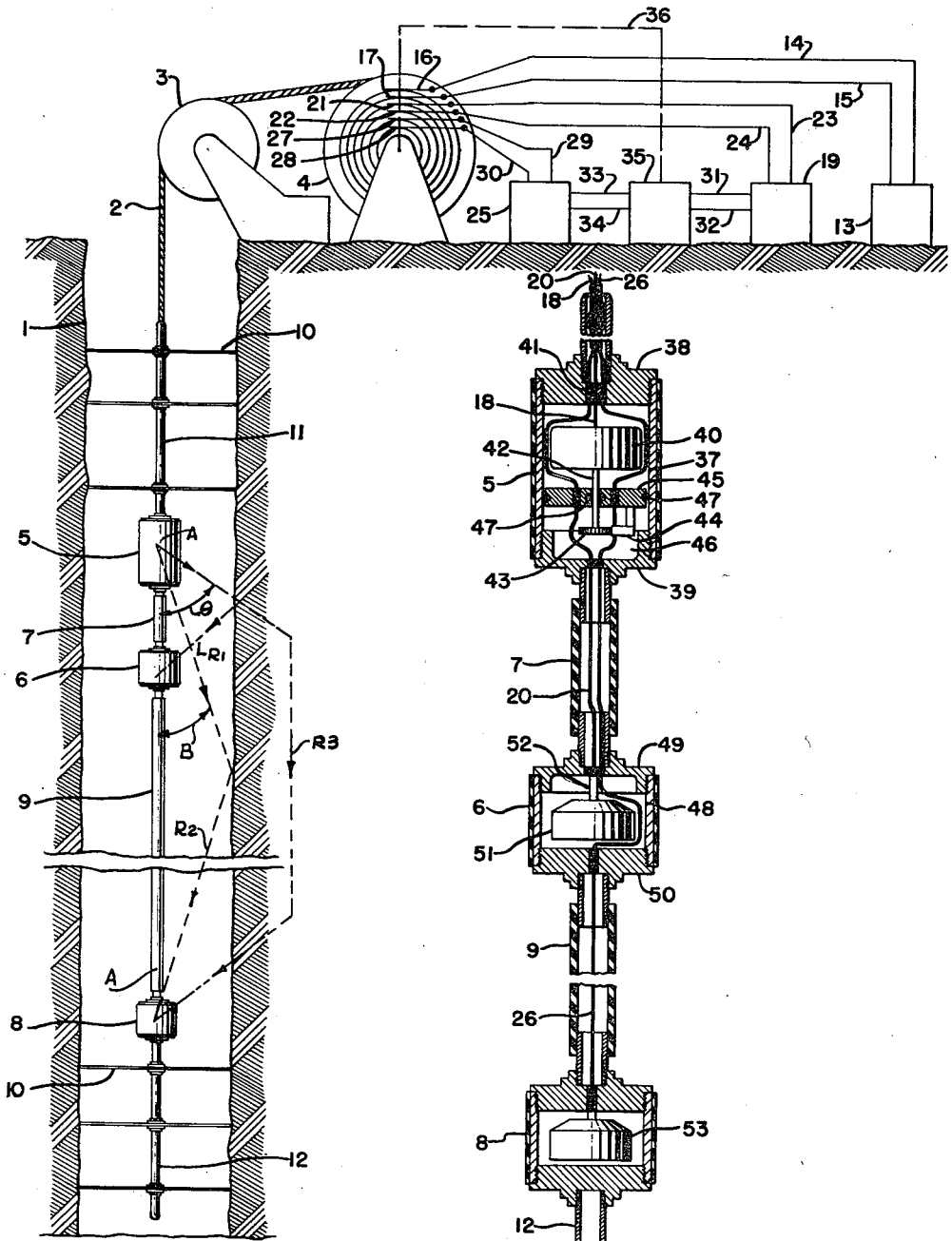

2,794,512

MEANS FOR DETERMINING ACOUSTICAL VELOCITY AND ATTENUATION CHARACTERISTICS OF SUBTERRANEAN FORMATIONS

John L. Martin, Irving, Tex., assignor to The Atlantic Refining Company, Philadelphia, Pa., a corporation of Pennsylvania Application July 27, 1953, Serial No. 370,565

3 Claims. (Cl. 181—.5)

This invention relates to well logging of boreholes formed in the earth, and more particularly to a method and apparatus for investigating the velocity and attenuation of acoustic energy in formations penetrated by such boreholes.

This application is a continuation-in-part of co-pending application, Serial No. 126,789, filed November 12, 1949, by John L. Martin, now Patent No. 2,694,461 for "Method and Apparatus for Acoustic Logging." In said co-pending application there is disclosed apparatus and means for obtaining an acoustic reflection log of a borehole whereby to determine the acoustic velocity characteristics of the formations traversed by the borehole. The present application encompasses the invention set forth in said co-pending application and in addition pertains to apparatus and means for obtaining simultaneously an acoustic reflection log and an acoustic refraction log of a borehole whereby to determine both the acoustic velocity characteristics and the acoustic attenuation characteristics of the formations traversed by the borehole. As will become apparent from the detailed discussion hereinafter, the acoustic reflection log serves a dual purpose of indicating the velocity characteristics of the formations traversed by the borehole and indicating the amplitude of acoustic energy, generated in the borehole, which enters said formations; while the acoustic refraction log serves as an indication of the amplitude of acoustic energy after it has traveled a predetermined distance, through the formations, from the point at which it entered the formations. The extent to which the several formations attenuate acoustic energy may therefore be determined by comparing the amplitude of the energy which enters the formations, as indicated by the reflection log, with the amplitude of the energy after travel through the formations, as indicated by the refraction log.

In the investigation of areas for subsurface structures indicative of the presence of petroleum in subsurface formations, there is commonly employed the well known method of surface seismic exploration. This method, involving the detonation of an explosive charge at one point on the surface of the earth and reception of reflected or refracted energy at a second point spaced a given distance from the one point, provides information as to the depth of the various subsurface strata. Based on such information obtained at several points in an area to be investigated a prediction can be made of the presence of subsurface structure favorable to petroleum deposits.

Although seismic exploration methods have been extensively employed for many years the interpretation of the records obtained thereby is quite difficult and frequently favorable structures are overlooked. The desirability of developing a method of obtaining information as to the velocity characteristic of subsurface formations for correlation with the conventional seismic record has been recognized in the industry. By "velocity characteristic," as used herein, is meant the velocity of acoustic or seismic energy through a given material.

Heretofore, various methods for obtaining this velocity information have been proposed but none of them have been entirely satisfactory for various reasons. Many of these methods involve the generation of acoustic energy at one point in a borehole traversing the formations to be investigated and determination of the time required for the energy to travel through the formation or formations between the generating point and another point in the borehole spaced a given distance therefrom. Such methods are not entirely satisfactory because of the difficulties encountered in accurately determining the travel time of the acoustic energy through the subterranean formations. Moreover, during the making of the determinations of the time required for energy to travel through the formation it is necessary that the apparatus in the well be brought to a complete stop and, therefore, a continuous log of the borehole cannot be obtained.

Also, it is important, in the investigation of areas for the presence of oil and gas, to obtain, in addition to an indication of the velocity characteristics of subterranean formations, an indication of the attenuation characteristics. Since attenuation of acoustic energy in traveling through earth formations is affected by the porosity and the nature of fluids contained therein (for instance, attenuation is much more rapid in a highly porous liquid-filled sandstone formation than in a tight sandstone formation which is devoid of liquid), it will be appreciated that information relative to attenuation characteristics is useful in determining these two factors.

Accordingly, it is one object of the present invention to provide an improved method and apparatus for determination of the velocity characteristic of subsurface formations.

Another object is to provide such a method and apparatus wherein the amount of acoustic energy reflected by a subsurface formation surrounding the borehole is determined to provide an indication of the velocity characteristic of such formation.

It is another object of the present invention to provide a method and apparatus for obtaining an indication of porosity and the probable nature of the fluid contents of subterranean formations penetrated by a borehole by investigating the attenuation of acoustic energy traveling through said formations.

Another object is to provide a method and apparatus for determining the attenuation of acoustic energy in formations penetrated by a borehole by generating acoustic energy within the borehole, determining the amplitude of such energy entering the formations in the vicinity of the point of generation and determining the amplitude of such energy after having entered and traveled through the formations to a point along the borehole remote from the point of generation.

A further object of the invention is to provide a method and apparatus for obtaining simultaneously in a borehole a log of acoustic energy reflected from the formations comprising the wall of the borehole as a measure of the energy entering the formations, and a log of acoustic energy which has traveled a predetermined distance through the formations forming the wall of the borehole; whereby, by comparison of the two logs, an indication may be obtained of the attenuation of acoustic energy traveling through the formations.

A still further object is to provide a method and apparatus for acoustic logging of a borehole penetrating a plurality of subterranean formations wherein acoustic energy is generated at one point in the borehole; acoustic energy reflected from the wall of the borehole is received at a second point in the borehole sufficiently near the one point so as to substantially exclude any energy which enters and travels through the wall; acoustic energy which enters and travels a predetermined distance through the formations is received at a third point in the borehole sufficiently removed from the one point so as to substantially exclude reflected energy; and the amplitudes of the energy received at the second and third points are determined and recorded as a function of depth to provide simultaneously logs of reflected and refracted energy which may be compared as an indication of attenuation of acoustic energy traveling through the formations penetrated by the borehole.

Other objects and features of the present invention will be apparent from the description and drawings which follow.

Figure 1 is a diagrammatic view showing a system constructed in accordance with this invention for simultaneously determining the velocity and attenuation of acoustic energy in formations penetrated by a borehole.

Figure 2 is an elevational view, in section, showing in detail the acoustic generator and receivers.

Relative to the embodiment of this invention which relates to the determination of the velocity characteristics of the formations penetrated by a borehole, the invention involves generating acoustic energy at one point in a borehole, receiving acoustic energy so generated and reflected from the wall of the borehole at another point in the borehole spaced from the one point, and determining the amplitude of the reflected energy. A velocity log of the borehole may be obtained for correlation with conventional seismic records by recording as a function of depth the amplitude of reflected energy from location to location along the entire length of the borehole, determined in this manner.

When acoustic energy traveling through a first homogeneous medium contacts a second homogeneous medium, a portion of the energy will pass into the second medium and the remainder will be reflected off the surface of the second medium in accordance with well known laws of physics. The amount of energy reflected is proportional to the ratio of velocity of seismic energy through the first medium to the velocity of such energy through the second medium.

Since the fluid in a borehole usually is substantially homogeneous, it will be readily seen that variations in the amplitude of reflected energy from location to location in the borehole will be indicative of variations in the velocity characteristic of the subterranean formations surrounding the borehole.

Considering that phase of the invention which relates to determining the attenuation of acoustic energy in traveling through subterranean formations, it will be understood by those familiar with the laws of physics that acoustic energy generated at a source located in a borehole will travel radially in all directions therefrom, a portion of the energy traveling directly through the borehole while other portions strike the borehole wall at varying angles of incidence. Of the total energy which reaches the interface between the fluid in the borehole and the formations comprising the wall of the borehole, a portion will enter the formations and the remainder will be reflected at the interface back into the borehole. Furthermore, it will be realized that, since the fluid in the borehole is usually substantially homogeneous, the total energy reaching the interface from a source of constant amplitude will remain substantially constant as the source is moved through the borehole. On the other hand, the division of the energy which reaches the interface between the borehole fluid and the borehole wall will not remain constant but will vary, depending upon the acoustic properties of the several formations traversed by the borehole, as the source is moved through the borehole. However, since the total of the energy reaching the interface remains constant, the amplitude of the portion entering the formation comprising the wall of the borehole at any given depth may be determined by measuring the amplitude of the energy reflected by that formation.

Thus, by moving a source of acoustic energy of constant amplitude through the borehole accompanied by a first acoustic energy detector which is adapted to receive energy reflected from the borehole wall but is incapable of receiving any of the energy which enters and travels through the borehole wall, and by measuring and recording the amplitude of the energy received by said first detector, it is possible to obtain a reflection log indicative of the amplitude of acoustic energy entering the wall of the borehole as a function of depth.

Further, it will be appreciated that the portion of the energy which enters the formation will travel radially in all directions therethrough, and the amplitude thereof will decrease with distance from the source in accordance with the attenuation characteristic of the formation which, as hereinbefore mentioned, is, in turn, dependent to a greart extent upon the nature of the fluid contained in the formation. A part of this energy will travel along the wall of the borehole, whence it will be refracted into the borehole, the amplitude thereof, however, having been decreased due to attenuation caused by travel through the formation.

By locating a second acoustic energy detector at a fixed distance from the energy-generating source such that said second detector can receive energy refracted from the borehole wall after travel through the formations comprising the borehole wall, but cannot receive any substantial portion of the generated energy reflected at the interface between the borehole fluid and the borehole wall, and by measuring and recording the amplitude of the energy received by said second detector, it is possible to obtain, as a function of depth, a refraction log, or a log of the amplitude of acoustic energy which has entered the formations comprising the wall of the borehole and traveled a predetermined fixed distance therethrough.

Since the first detector, which is adapted to receive reflected energy, provides a log indicative of the amplitude of generated acoustic energy entering the formation in the vicinity of the generating means, and since the second detector provides a log indicative of the amplitude of said entering energy after having traveled a fixed distance through the formation comprising the borehole wall between the source and the second detector, it will be appreciated that a comparison of the two logs at each depth to which the source is moved in the borehole will provide an indication of the extent to which energy which enters the formation comprising the wall of the borehole at each depth is attenuated in traveling a predetermined distance therethrough, and hence, of the attenuation characteristics of said formation.

Referring to the drawing, and particularly at this time to Figure 1, there is shown a system, constructed in accordance with the invention, for simultaneously determining the velocity of acoustic energy through, and attenuation of acoustic energy by, subterranean formations penetrated by a borehole. This system includes an instrument adapted to be lowered into a borehole 1 on the end of a multiconductor cable 2 which passes over a sheave 3 located at the surface of the earth adjacent the mouth of the borehole 1 and is wound on a suitable reel 4 operated either manually or mechanically. The borehole instrument, described in detail below in connection with Figure 2, includes an acoustic energy source or generating means 5, a first receiver or pickup 6, mechanically connected with, and maintained a predetermined distance from, generator 5 by connector 7 preferably formed of rubber or other resilient material, and a second receiver or pickup 8, mechanically connected to and maintained a predetermined distance below first receiver 6 by connector 9 which is similar to, but considerably longer than, connector 7. Direct transmission of acoustic energy from the generator 5 to pickups 6 and 8 from the second receiver 8 is met by placing the second pickup at a distance from the generator 5 such that the amplitude of the reflected energy will be attenuated to a substantially insignificant value by the time it travels from the generator to the said detector. Since the path followed by reflected energy lies completely within the borehole fluid, which has high attenuation characteristics, the amplitude of reflected energy reaching the second detector will normally be insignificant compared to refracted energy if the second detector is located at a distance from the generator equal to at least ten times the diameter of the borehole.

Of course, with the arrangement described above it will be realized that each of the two detectors will pick up some energy which travels directly through the borehole; however, since the fluid in the borehole will normally be substantially homogeneous such directly traveling energy picked up by each detector will remain substantially constant so that it can be taken into account in interpreting the logs produced by each detector, and therefore no effort need be made to completely eliminate the effects of such directly traveling energy on the detectors. It should also be realized that receiver 6 picks up only the reflected wave traveling along the path $R_1$ and therefore the signal recorded which is a function of the coefficient of reflection of the wall of the borehole is a separate plot of the velocity characteristics of the formations traversed by the borehole; while on the other hand the receiver 8 picks up essentially only the refracted waves traveling along paths such as $R_3$, and the signal recorded from receiver 8 which is dependent upon the coefficient of reflection and the attenuation properties of the formations traversed by the borehole is a separate plot of the attenuation and velocity characteristics of such formations. From a comparison of these two plots the attenuation characteristics of such formations can be accurately determined.

In operation, after the apparatus has been assembled, as shown in Figure 1, the instrument is lowered into the borehole 1 which is filled with a substantially homogeneous fluid, while acoustic energy of substantially constant frequency and amplitude is being continuously generated by generator 5. As the borehole instrument is moved along the borehole the energy traveling along path $R_1$ and reflected by the various formations comprising the walls of the borehole and received by pickup 6 is converted into corresponding electrical energy which is conducted to the surface of the earth where it is amplified in amplifier 19 and thence measured and recorded as a function of depth by means of recording vacuum tube voltmeter 35. Since, as explained hereinabove, pickup 6 is located at a distance with respect to generator 5 such that it detects reflected energy to the exclusion of refracted energy, and in view of the above described relationship between energy reflected by the formations comprising the borehole wall and the velocity of acoustic energy in said formations, it will be appreciated that the acoustic reflection log thus produced is a plot of the velocity characteristics of the formations traversed by the borehole.

In addition, since the amplitude of the energy source is maintained substantially constant, and since the borehole fluid is substantially homogeneous, it will be appreciated that the log also serves as an indication of the energy entering the formations surrounding the borehole in the vicinity of pickup 6 and the closely proximate generator 5.

Simultaneously, energy traveling a path such as $R_3$ and which enters the formations in the vicinity of pickup 6 and generator 5, and travels therethrough and is then refracted back into the borehole in the vicinity of pickup 8 is received by pickup 8 and converted into corresponding electrical energy which is conducted to amplifier 25 and then passed to recording voltmeter 35. The acoustic refraction log thus obtained as a result of plotting the energy received by pickup 8 provides an indication, as a function of depth, of the amplitude of energy existing in the formation after travel through the formation from the vicinity of pickup 6 and generator 5 to the vicinity of pickup 8.

The two logs thus produced may, therefore, be compared to provide an indication of the attenuation characteristics of the formations penetrated by the borehole as a function of depth of the formations. This will be obvious from a consideration of the fact that the reflection log provides an indication of energy entering the formations in the vicinity of the first pickup, which is relatively close to the generator, while the refraction log provides an indication of the energy level existing after the energy has traveled a fixed distance through the formations to the vicinity of the second pickup. It is essential, of course, that the two logs be produced simultaneously in order to insure accurate correlation between the two and to minimize the effects of errors which might be introduced, as for instance by slight variations in the amplitude or frequency of the energy source. For example, when both logs are obtained simultaneously, a decrease in amplitude of the source energy would show up on both logs as occurring at the same depth, and thus would be recognizable as such a decrease; whereas if the two logs were run independently, there would be no means for recognizing such a decrease in source energy as such.

It is preferable that the housings of generator 5 and pickups 6 and 8 be formed of a material, such, for example, as synthetic resin having a velocity characteristic approximating that of water so as to obtain good acoustic energy transmission between the borehole fluid and such housing. However, other materials, such as stainless steel, may be employed, if it is desired, without departing from the scope of the invention.

While the apparatus shown in the drawing and explained hereinabove is adapted to provide simultaneously information both as to the velocity characteristics and the attenuation characteristics of formations penetrated by a borehole, it will be understood that, if only velocity characteristics are desired, such information may be obtained by an apparatus similar to that shown in the drawing, but adapted to provide only the log produced by the detector 6. Thus, a suitable apparatus for producing only a velocity log would be provided by eliminating, from the apparatus shown in the drawings, the detector 8 and amplifier 25, and substituting for dual-stylus recorder 35 a suitable single-stylus recorder responsive only to signals received from detector 6.

While in the foregoing there has been shown and described the preferred embodiment of this invention, it is to be understood that minor changes in the details of construction, combination, and arrangement of parts may be resorted to without departing from the spirit and scope of the invention as claimed.

I claim:

1. Apparatus for determining the attenuation of acoustic energy through formations penetrated by a borehole comprising an acoustic energy generating means and first and second acoustic energy detecting means adapted to be moved through said borehole as a unit, said acoustic energy generating means being adapted to generate acoustic energy of substantially constant frequency and amplitude, said first acoustic energy detector being spaced a first fixed distance vertically from said generating means, said first fixed distance being such that the acute angle formed between the axis of the borehole and the path of received energy is greater than the angle whose sine is the ratio of the velocity of the acoustic energy in the borehole to the lowest velocity of the acoustic energy that is at least greater than the velocity of the acoustic energy in the borehole and that is to be encountered in the wall of the borehole whereby the energy received by said first detecting means comprises may be reduced by filling connectors 7 and 9 with oil and steel wool. To prevent source 5 and pickups 6 and 8 from striking the wall of the borehole as the apparatus is moved therealong, a series of centralizers or bumpers 10, preferably formed of rubber, are provided on each of rods 11 and 12 which are threadedly connected above generator 5 and below receiver 8, respectively.

A power source 13 for operating acoustic generator 5 is connected to the latter through electrical leads 14 and 15, brush contacts 16 and 17, and a pair of conductors 18 of multiconductor cable 2. Acoustic energy received by pickup 6 is converted into electical signals which are passed into a conventional amplifier 19 by means of another pair of conductors 20 of cable 2, brush contacts 21 and 22 of reel 4 and electrical leads 23 and 24. Similarly, acoustic energy received by pickup 8 is converted into electrical signals which are passed to another conventional amplifier 25 located at the earth's surface by means of another pair of conductors 26 of cable 2, brush contacts 27 and 28 of reel 4, and electrical leads 29 and 30. The outputs of amplifiers 19 and 25 are directly connected by leads 31 and 32 and leads 33 and 34, respectively, to a conventional dual-stylus recording vacuum tube voltmeter 35, wherein the amplitudes of energy received by pickups or receivers 6 and 8 are separately measured and recorded as functions of depth. For this purpose reel 4 is directly connected with voltmeter 35 through mechanical linkage 36 in accordance with well known practices. Although it is preferable to employ a dual stylus recording vacuum tube voltmeter for measuring and recording electrical signals produced in the outputs of amplifiers 19 and 25, there may be employed for this purpose any conventional device or devices suitable for measuring the amplitude of such signals and any conventional recorder, or two separate recorders, adapted to operate with the selected measuring devices to continuously record measured values.

Referring now to Figure 2, the borehole instrument, as above mentioned, includes an acoustic generator 5, a first acoustic pickup 6 maintained in spaced relationship with, and mechanically connected to generator 5 through connector 7, and a second acoustic pickup 8 maintained in spaced relation with, and mechanically connected to, first acoustic pickup 6 through connector 9.

Acoustic generator 5 consists of a cylindrical housing 37 closed at its ends by end plates 38 and 39. Within generator housing 37 is mounted, by any suitable means not shown, a device for continuously generating acoustic waves or energy of substantially constant frequency and amplitude. Any conventional device adapted to generate such waves may be employed. In Figure 2, however, there is shown for purposes of illustration an acoustic generator which has been found satisfactory. This generator comprises a direct current motor 40 to which power is supplied from power source 13 consisting, for instance, of a bank of batteries, by a pair of conductors 18 of cable 2 which extends into generator housing 37 through rubber gasket 41 provided, as shown, in end plate 38. On motor shaft 42 is formed a toothed wheel or gear 43. A leaf spring 44 is secured by screws or other suitable means, not shown, to partition 45 in a manner such that spring 44 is deflected by the gear teeth as gear 43 rotates. It will be seen that acoustic waves, or energy, will be generated as spring 44 successively strikes each of the gear teeth. Although, for purposes of illustration, only one leaf spring is shown, two or more may be employed if desired. The frequency of the generated acoustic energy covers a relatively wide frequency band, but the dominant frequency is determined by the speed at which gear 43 rotates and the number of teeth formed thereon. The dominant frequency is preferably of the order of 1,000 cycles per second.

Partition 45 is provided in housing 37 for stabilizing motor shaft 42 which extends therethrough and also to form compartment 46 in the lower end of the housing. In order to secure good transfer of the generated energy to the borehole, compartment 46 is filled with naptha or other suitable liquid which is prevented from flowing into the remainder of the housing by O rings 47.

Pickup 6 includes a housing 48 closed at its ends by end plates 49 and 50. Within pickup housing 48 there is mounted a device for picking up, or receiving, acoustic energy. Although any conventional receiver adapted to pick up acoustic energy may be employed, it is preferred to utilize a piezoelectric crystal type pickup. The crystal, not shown, is enclosed within a suitable housing 51 mounted on the free end of support 52 secured by cementing or other means to end plate 49. As is well known, acoustic waves acting on the piezoelectric crystal cause deformation thereof, resulting in the generation of electrical signals of similar wave form and of an amplitude proportional to the acoustic waves. The electrical signals as described hereinbefore are passed by means of a pair of conductors 20 of cable 2 into amplifier 19 located at the earth's surface, wherein they are amplified before passing into recording vacuum tube voltmeter 35 for measurement of the amplitude thereof and recordation of the measured values. As shown, a pair of conductors 20 extends through generator housing 37, connector 7, and support 52 into the crystal housing 51, wherein it is connected with the piezoelectric crystal. To obtain good transmission of acoustic energy between the borehole fluid and the acoustic pickup 6, housing 48 may be filled with naptha or other suitable liquid as is compartment 46 of housing 37.

Pickup 8 preferably is identical in construction and operation to pickup 6, the electrical signals generated by the piezoelectric crystal thereof being passed by means of pair of conductors 26 of cable 2 into amplifier 25 and thence to recording vacuum tube voltmeter 35. As shown, pair of conductors 26 extends through generator housing 37, connector 7, housing 48 of first pickup 6, connector 9, and into the crystal housing 53 of pickup 8 wherein it is connected with the piezoelectric crystal.

Receiver 6 must be spaced from generator 5 a distance such that it can receive energy generated by generator 5 and reflected from the wall of the borehole, but cannot receive any energy which has entered the formation comprising the wall of the borehole and been refracted therethrough. This is accomplished by spacing receiver 6 from generator 5 a distance small enough so that the acute angle formed between the axis A of the borehole and the path $R_1$ of the received energy, such as shown in Figure 1 at $\theta$, is greater than the angle whose sine is equal to the ratio of the velocity of the energy in the borehole liquid to the lowest velocity of the energy that is at least greater than the velocity of the energy in the borehole and that can be expected to be encountered in the formations surrounding the borehole. Under such conditions all the energy picked up by receiver 6 and traveling directly through the borehole liquid will be reflected from the formation to the exclusion of refracted energy.

The second receiver 8 must be so located with respect to the generating means that it may receive energy refracted through the formation comprising the wall of the borehole but may not receive any substantial amount of the energy which was reflected from the wall of the borehole. This is accomplished by spacing receiver 8 from generator 5 a distance which is at least great enough so that the acute angle formed between the axis A of the borehole and the path $R_2$ of any reflected wave which might strike the receiver 8 if it were not completely attenuated, such angle being shown at B in Figure 1, is smaller than the angle whose sine is the ratio of the velocity of the acoustic energy in the borehole to the lowest velocity of the acoustic energy that is at least greater than the velocity of the acoustic energy in the borehole and that is to be encountered in the wall of the borehole. The requirement for eliminating reflected energy energy reflected from the wall of the borehole to the exclusion of energy refracted through the wall of the borehole, said second detector being spaced a second distance vertically from said generating means, said second fixed distance being such that the acute angle formed between the axis of said borehole and the path of any reflected wave which might strike the receiver if it were not completely attenuated is smaller than the angle whose sine is the ratio of the velocity of the acoustic energy in the borehole to the lowest velocity of the acoustic energy that is at least greater than the velocity of the acoustic energy in the borehole and that is to be encountered in the wall of the borehole, and means for independently determining the amplitude of the energy detected by said first and second detecting means.

2. Apparatus for determining the attenuation of acoustic energy through formations penetrated by a borehole comprising an acoustic energy generating means and first and second acoustic energy detecting means adapted to be moved through said borehole as a unit, said acoustic energy generating means being adapted to generate acoustic energy of substantially constant frequency and amplitude, said first acoustic energy detector being spaced a first fixed distance vertically from said generating means, said first fixed distance being such that the acute angle formed between the axis of the borehole and the path of received energy is greater than the angle whose sine is the ratio of the velocity of the acoustic energy in the borehole to the lowest velocity of the acoustic energy that is at least greater than the velocity of the acoustic energy in the borehole and that is. to be encountered in the wall of the borehole whereby the energy received by said first detecting means comprises energy reflected from the wall of the borehole to the exclusion of energy refracted through the wall of the borehole, said second detector being spaced a second distance vertically from said generating means, said second fixed distance being such that the acute angle formed between the axis of said borehole and the path of any reflected wave which might strike the receiver if it were not completely attenuated is smaller than the angle whose sine is the ratio of the velocity of the acoustic energy in the borehole to the lowest velocity of the acoustic energy that is at least greater than the velocity of the acoustic energy in the borehole and that is to be encountered in the wall of the borehole, means for independently determining the amplitude of the energy detected by said first and second detecting means, and means for moving the generating means and detecting means as a unit the vertical length of the borehole.

3. Apparatus for determining the attenuation of acoustic energy through formations penetrated by a borehole comprising an acoustic energy generating means and first and second acoustic energy detecting means adapted to be moved through said borehole as a unit, said acoustic energy generating means being adapted to generate acoustic energy of substantially constant frequency and amplitude, said first acoustic energy detector being spaced a first fixed distance vertically from said generating means, said first fixed distance being such that the acute angle formed between the axis of the borehole and the path of received energy is greater than the angle whose sine is the ratio of the velocity of the acoustic energy in the borehole to the lowest velocity of the acoustic energy that is at least greater than the velocity of the acoustic energy in the borehole and that is to be encountered in the wall of the borehole whereby the energy received by said first detecting means comprises energy reflected from the wall of the borehole to the exclusion of energy refracted through the wall of the borehole, said second detector being spaced a second distance vertically from said generating means, said second fixed distance being such that the acute angle formed between the axis of said borehole and the path of any reflected wave which might strike the receiver if it were not completely attenuated is smaller than the angle whose sine is the ratio of the velocity of the acoustic energy in the borehole to the lowest velocity of the acoustic energy that is at least greater than the velocity of the acoustic energy in the borehole and that is to be encountered in the wall of the borehole, means for independently determining the amplitude of the energy detected by said first and second detecting means, and means for moving the generating means and detecting means as a unit the vertical length of the borehole, the first and second acoustic energy detecting means comprising piezoelectric crystal detectors.

References Cited in the file of this patent

UNITED STATES PATENTS

| | | |
|---|---|---|
| 2,191,120 | Slichter | Feb. 20, 1940 |
| 2,233,992 | Wyckoff | Mar. 4, 1941 |
| 2,350,371 | Smith | June 6, 1944 |
| 2,596,024 | Goble et al. | May 6, 1952 |